US009432484B1

(12) United States Patent
Xie et al.

(10) Patent No.: US 9,432,484 B1
(45) Date of Patent: Aug. 30, 2016

(54) CIM-BASED DATA STORAGE MANAGEMENT SYSTEM HAVING A RESTFUL FRONT-END

(71) Applicant: EMC Corporation, Hopkinton, MA (US)

(72) Inventors: Ying Xie, Harvard, MA (US); Xuan Tang, Hopkinton, MA (US); David A. Parenti, Westborough, MA (US); James Odis Pendergraft, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 357 days.

(21) Appl. No.: 14/135,029

(22) Filed: Dec. 19, 2013

(51) Int. Cl.
*G06F 15/16* (2006.01)
*H04L 29/06* (2006.01)

(52) U.S. Cl.
CPC .................................... *H04L 67/42* (2013.01)

(58) Field of Classification Search
CPC ....................................................... H04L 67/42
See application file for complete search history.

(56) References Cited

U.S. PATENT DOCUMENTS 8,447,782 B1 * 5/2013 Vipul .................. G06F 17/3056 707/790
9,075,882 B1 * 7/2015 Ward ................ G06F 17/30867
2011/0161477 A1 * 6/2011 Kowalski ............ H04L 67/2823 709/223
2013/0072153 A1 * 3/2013 Lawson ................ H04L 51/043 455/410
2013/0246646 A1 * 9/2013 Iliev ........................ H04L 69/22 709/232
2013/0318061 A1 * 11/2013 Said .................. G06F 17/30171 707/705
2014/0310392 A1 * 10/2014 Ho .......................... H04L 69/16 709/223

OTHER PUBLICATIONS

Robert J. Pelowski, et al., "Dynamically Selectable Transport for Kernel Driver Management", U.S. Appl. No. 13/537,868, filed Jun. 29, 2012.

* cited by examiner

*Primary Examiner* — Nicholas Taylor
*Assistant Examiner* — Tania Pena-Santana
(74) *Attorney, Agent, or Firm* — BainwoodHuang

(57) ABSTRACT

Techniques are directed to a method performed by a computing device. The method includes (a) receiving, from a client via a network connection of the computing device, a first management request to manage a data storage system, the first management request being in a RESTful style, (b) generating, by the computing device, a second management request formatted in a non-RESTful style compliant with a back-end storage management protocol, (c) sending the second management request to a back-end storage management server, (d) receiving a first management response from the back-end storage management server in response to the second management request, the first management response being formatted in the non-RESTful style compliant with the back-end storage management protocol, (e) converting, by the computing device, the first management response into a second management response in the RESTful style, and (f) sending the second management response to the client via the network connection.

11 Claims, 7 Drawing Sheets

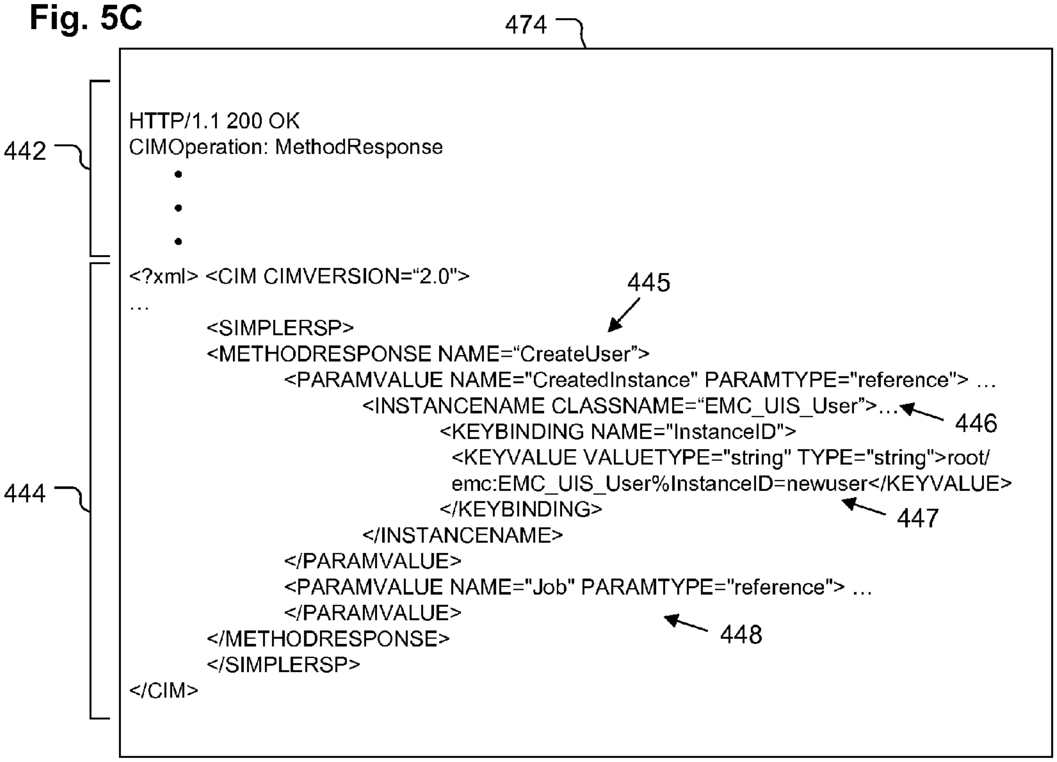

```
HTTP/1.1 200 OK
CIMOperation: MethodResponse
 •
 •
 •
```
442

```
<?xml> <CIM CIMVERSION="2.0">
...
    <SIMPLERSP>                              445
    <METHODRESPONSE NAME="CreateUser">
        <PARAMVALUE NAME="CreatedInstance" PARAMTYPE="reference"> ...
            <INSTANCENAME CLASSNAME="EMC_UIS_User">...
                <KEYBINDING NAME="InstanceID">          446
                    <KEYVALUE VALUETYPE="string" TYPE="string">root/
                    emc:EMC_UIS_User%InstanceID=newuser</KEYVALUE>
                </KEYBINDING>                                   447
            </INSTANCENAME>
        </PARAMVALUE>
        <PARAMVALUE NAME="Job" PARAMTYPE="reference"> ...
        </PARAMVALUE>                         448
    </METHODRESPONSE>
    </SIMPLERSP>
</CIM>
```
444

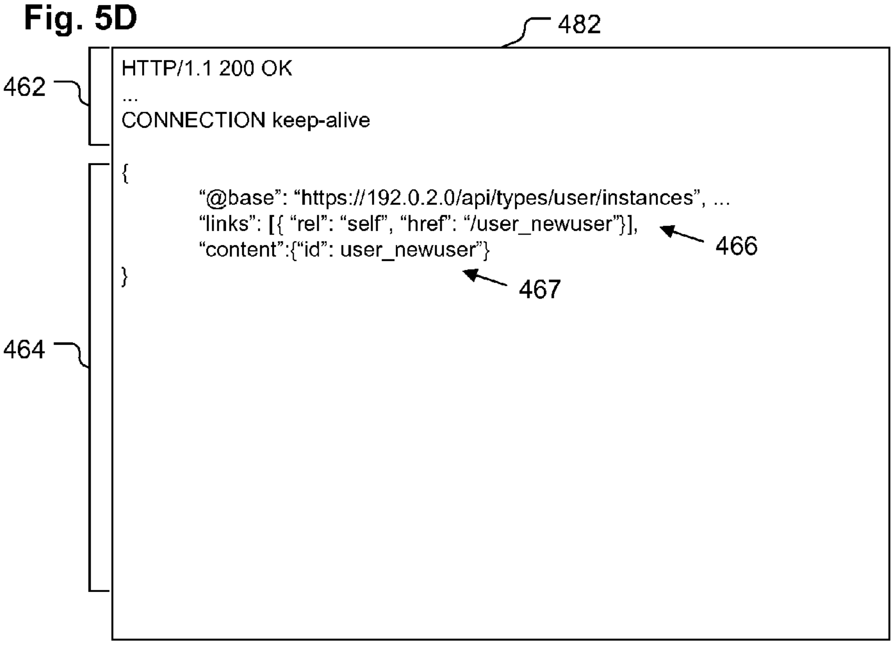

```
HTTP/1.1 200 OK
...
CONNECTION keep-alive
```
462

```
{
    "@base": "https://192.0.2.0/api/types/user/instances", ...
    "links": [{ "rel": "self", "href": "/user_newuser"}],
    "content":{"id": user_newuser}               466
}
                        467
```
464

CIM-BASED DATA STORAGE MANAGEMENT SYSTEM HAVING A RESTFUL FRONT-END

BACKGROUND

Data storage systems are used to store large quantities of data in a fast and integrated manner. Data storage systems are often configured to provide a management interface to a user, such as a storage administrator, operating a management application in network communication with a management server in communication with the data storage system. The management application allows the user to view information about the configuration and operation of the data storage system.

In a typical arrangement, the management server maintains a set of Common Information Model (CIM) objects in memory in order to represent the state of the data storage system. The management application communicates with the management server using the CIM protocol encoded in XML format (CIM-XML format).

SUMMARY

Unfortunately, the above-described management applications may suffer from deficiencies. For example, the CIM-XML format does not allow management data to be processed before being sent to the management application. Thus, if the user wishes to see filtered or paged data, the management application must apply filtering or paging locally at the client side. This is inefficient because it may require a large amount of data to be sent across the network even though only a small amount of data is desired. It may also be undesirable if the management application is running on a thin client, such as a cell phone, which does not have much processing power.

Another deficiency with the conventional approach is that since CIM-XML does not use REpresentational State Transfer (REST) compliant communications, communication between the management application and the management server using HTTP is not efficient. This is because the HTTP application layer is not aware of the context of the CIM-XML communications; thus, caching of responses to idempotent and nullipotent requests will not function correctly because the HTTP application layer is not aware which CIM-XML requests are idempotent or nullipotent. Another deficiency is that most web developers currently prefer to develop RESTful applications, so utilizing CIM-XML decreases the likelihood that developers will port the management application to a large number of platforms.

In order to alleviate these problems, it would be desirable to allow the management client to communicate across the network in a RESTful manner with processing functions being implemented at the server side. Thus, in contrast to the above-described approaches, improved techniques are described for using a web server in front of a CIM-based management server to mediate, translate, and process between RESTful communications with a management application and CIM-XML based communications with the CIM-based management server.

One embodiment of the improved techniques is directed to a method performed by a computing device. The method includes (a) receiving, from a client via a network connection of the computing device, a first management request to manage a data storage system, the first management request being in a RESTful style, (b) generating, by the computing device, a second management request in a non-RESTful style compliant with a back-end storage management protocol, (c) sending the second management request to a back-end storage management server, (d) receiving a first management response from the back-end storage management server in response to the second management request, the first management response being in the non-RESTful style compliant with the back-end storage management protocol, (e) converting, by the computing device, the first management response into a second management response in the RESTful style, and (f) sending the second management response to the client via the network connection. Other embodiments are directed to a system, a computerized apparatus, and a computer program product for performing methods similar to that described above. These embodiments are advantageous because they allow the management client to communicate across the network in a RESTful manner.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIGS. 5A-5D depict various example communications between elements of the example system in a second example use case according to various embodiments.

DETAILED DESCRIPTION

Embodiments are directed to techniques for using a web server in front of a CIM-based management server to mediate, translate, and process between RESTful communications with a management application and CIM-XML based communications with the CIM-based management server.

Figure 1:
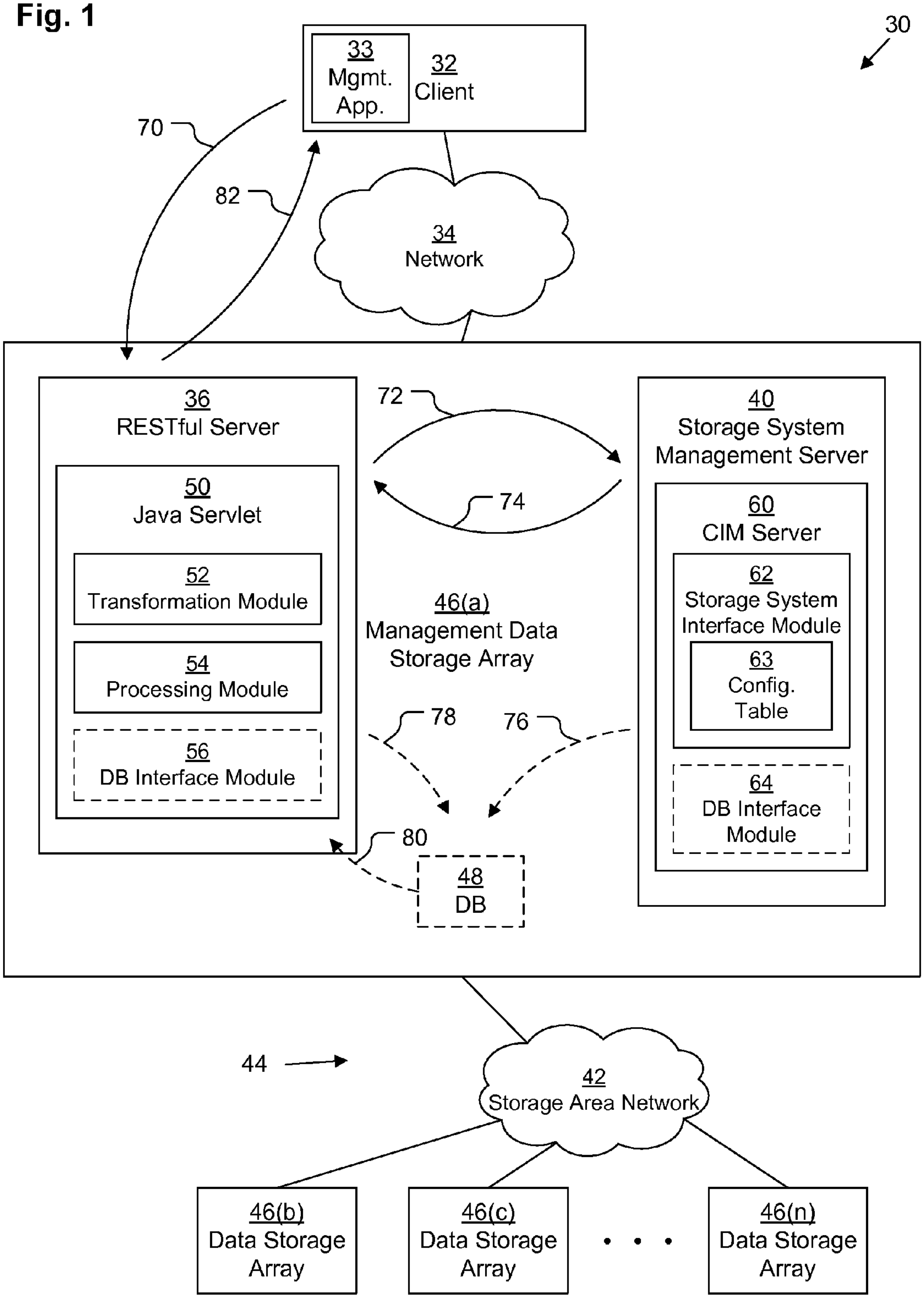
FIG. 1 depicts an example environment for use in performing various embodiments.

FIG. 1 depicts an example data storage environment 30. Environment 30 includes a client 32, which connects via network 34 to a management data storage array 46(*a*) which runs management software configured to manage a data storage system 44 that it connects to via network 42. Network 42 contains one or more data storage arrays 46 (depicted as arrays 46(*a*), 46(*b*), . . . , 46(*n*)), such as, for example, VNXe Series data storage arrays produced by the EMC Corp. of Hopkinton, Mass. The management software is storage system management server 40, which is back-end software with a front-end RESTful web server 36 providing client 32 access to its data. Additional details with respect to the hardware of management data storage array 46(*a*) is discussed below, in connection with FIG. 2.

In some embodiments (not depicted), instead of the RESTful web server 36 and the storage system management server 40 running on the same machine, they may be realized on separate machines. In addition, in some embodiments (not depicted), the machines on which RESTful server 36 and storage system management server 40 run may be computing devices separate from any of the data storage arrays 46.

It should be understood that although networks 34, 42 are depicted separately, in some embodiments, these networks 34, 42 may be shared. Each of networks 34, 42 may be any kind of data communication network, such as for example the Internet, a local area network (LAN), a wide area network, a storage area network (SAN), a virtual private network (VPN), a cellular data network, a wireless local area network, an interconnected fabric of connections and switches, similar systems, and combinations thereof. Typically, network 34 is the Internet or a VPN operating over the Internet, while network 42 is a SAN. In some embodiments (not depicted), network 34 includes one or more HTTP-aware caching servers, such as, for example, a content server within a content delivery network within network 34. These HTTP-aware caching servers may be configured to cache HTTP responses to idempotent and nullipotent HTTP requests in order to reduce HTTP request-response latencies.

Client 32 is a computing device operated by a user (not depicted), such as a storage administrator of data storage system 44. Client 32 may be any kind of computing device, such as, for example, a personal computer, a workstation computer, a server computer, an enterprise server computer, a laptop computer, a tablet computer, a smart phone, etc. Client 32 runs a management application 33, which may be, for example, a web browser displaying pages downloaded from RESTful server 36. The user is able to operate the management application 33 to obtain information about the configuration and performance of the data storage system 44. The user is also able to operate the management application 33 to issue instructions to change the configuration of the data storage system 44.

Client 32 includes network interface circuitry, a processor, memory, and user interface circuitry (not depicted). The user interface circuitry allows the client 32 to interface with the user via user input/output devices (e.g., display screens, keyboards, mice, printers, touch sensitive screens, track pads, etc.). The network interface circuitry may include an Ethernet card, a cellular modem, a Wireless Fidelity (WiFi) wireless networking adapter, any other device for connecting to a network 34 or some combination thereof. The processor may be any kind of processor or set of processors configured to perform operations, such as, for example, a microprocessor, a multi-core microprocessor, a digital signal processor, a system on a chip, a collection of electronic circuits, a similar kind of controller, or any combination of the above. The memory may be any kind of digital system memory, such as, for example, random access memory (RAM). Memory stores an operating system (OS) (e.g., Linux, UNIX, Windows, or similar operating systems) and one or more applications 110, including management application 33 and possibly a web browser, executing on the processor as well as data used by those programs. In the context of a client 32, applications 110 include the management application 33 and, in some embodiments, a web browser.

RESTful server 36 is a web server configured to send and receive HTTP messages to/from client 32 as well as other clients via network 34. RESTful server 36 runs a Java Servlet 50 (although this is by way of example only—other types of applications which extend the behavior of a web server are also envisioned) which is configured to translate between RESTful communications with client 32 and non-RESTful communications with storage system management server 40 (and optional database 48). Transformation module 52 is configured to translate incoming RESTful requests 70 issued by management application 33 into CIM-XML requests 72 that are sent to storage system management server 40. Transformation module 52 is also configured to translate incoming CIM-XML responses 74 issued by storage system management server 40 into RESTful responses 82 that are sent back to the management application 33. In some cases, depending on the nature of the incoming RESTful request 70, processing module 54 may be called upon to process the results from the received CIM-XML response 74 prior to being transformed into RESTful response 82, such as by filtering, chunking, paging, etc., as is described below in further detail.

In some embodiments, Java Servlet 50 also includes a database interface module 56, which is configured to fulfill certain incoming RESTful requests 70 with reference to an external database 48 rather than by transforming the requests into CIM-XML requests 72 sent to the storage system management server 40. In particular, any nullipotent RESTful request 70 (which does not alter the configuration of the data storage system 44) may be eligible to be fulfilled via the database 48 rather than by the storage system management server 40. Generally, a RESTful request 70 which includes a GET command is nullipotent and therefore eligible to be fulfilled by database 48, although, if the database 48 does not yet contain the requested information, it may still be necessary to seek the requested information from the storage system management server 40 by issuing a CIM-XML request 72. Database interface module 56 is configured to send a database request 78 to the database 48 based on the received RESTful request 70. In response, database 48 returns a database response 80 to the database interface module 56, which can then be processed by processing module 54 and transformed into a RESTful response 82 by transformation module 52.

Storage system management server 40 is a configuration service configured to manage the configuration of data storage system 44. Storage system management server 40 runs a CIM server application 60, which is configured to receive CIM-XML requests 72, process them (e.g., by making a change to a configuration detail of the data storage system 44 or by obtaining a set of informative records about the configuration or performance of the data storage system 44), and send back CIM-XML responses 74. Storage system interface module 62 interfaces with the data storage system 44 to obtain configuration and performance data and to modify configuration settings. For example, if a CIM-XML request 72 is received asking for a list of all LUNs configured on a particular data storage array 46(X), storage system interface module 62 might contact a storage processor of that data storage array 46(X) in order to obtain the list of LUNs configured on that array 46(X), and then CIM server 60 would send back a list of CIM object records, one for each LUN, as part of the CIM-XML response 74. In some embodiments, storage system interface module 62 includes a configuration table 63 which locally stores the configuration data so that the storage system interface module 62 does not need to contact the various data storage arrays 46 every time configuration data is needed. Configuration table 63 may, for example, maintain various sets of CIM objects representing elements of data storage system 44. As another example, if a CIM-XML request 72 is received with an instruction to add a new LUN to a particular data storage array 46(X), storage system interface module 62 might contact a storage processor of that data storage array 46(X) in order to issue a command to that data storage array 46(X)

to add the new LUN. As part of the CIM-XML response 74, the CIM server 60 might then send back the configuration details of the newly added LUN, or it might send back a list of all LUNs configured on that data storage array 46(X).

In some embodiments, CIM server 60 also includes a database interface module 64, which is configured to update the database 48 with a database update command 76. In some embodiments, any time CIM server 60 responds to a CIM-XML request 72 with a CIM-XML response 74, the configuration or performance information included within the CIM-XML response 74 is also included within the database update command 76 in order to keep the database 48 up-to-date. In other embodiments, database interface module 64 only sends a database update command 76 to the database 48 when the CIM-XML request 72 includes an instruction to modify the configuration of the data storage system 44 (e.g., a non-nullipotent request involving an HTTP PUT, POST, or DELETE command) or when the CIM-XML request 72 includes a request for performance information. In such embodiments, it can be assumed that all existing configuration data of the data storage system 44 was previously added to the database 48 when that configuration data was first configured.

Figure 2:
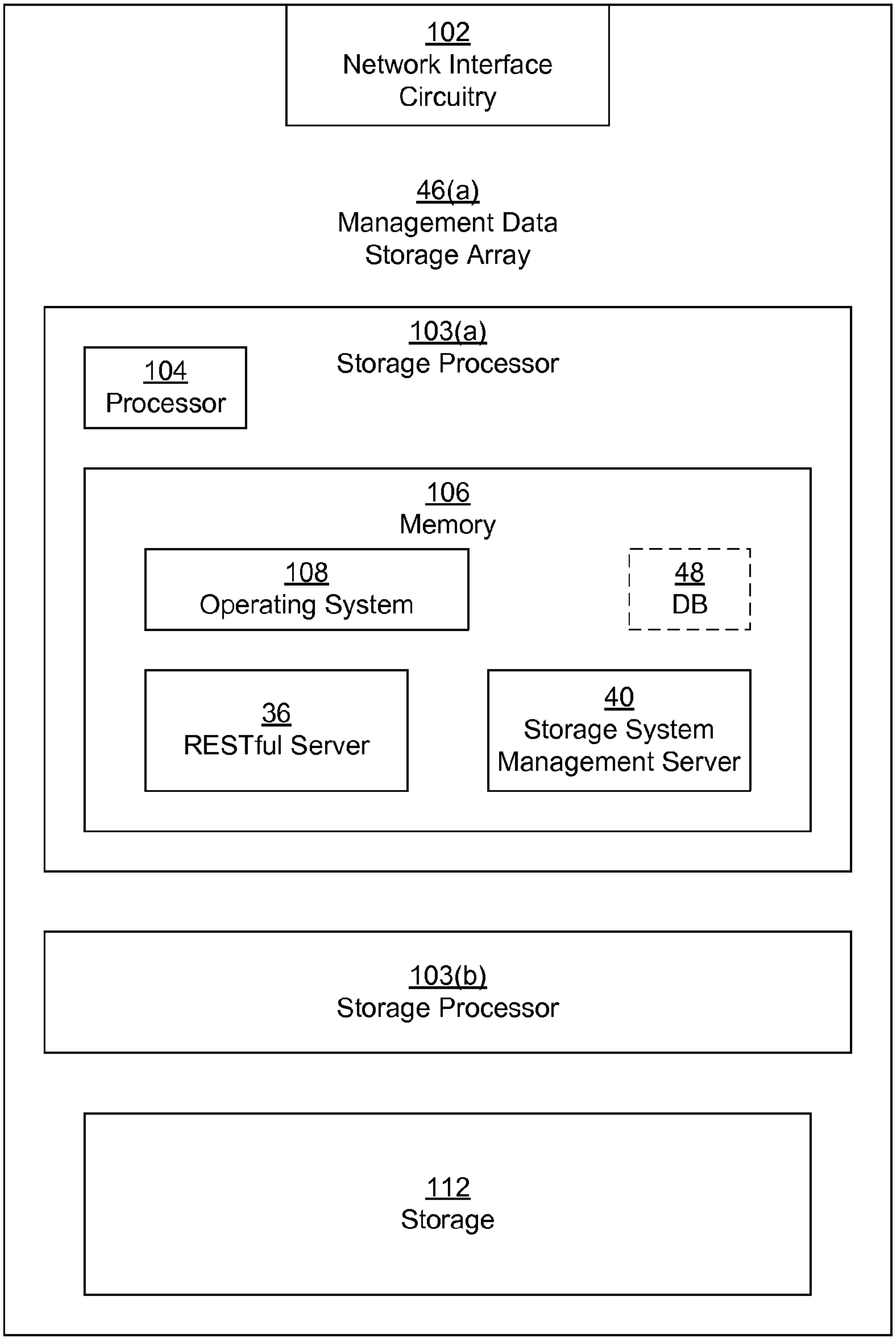
FIG. 2 depicts an example apparatus according to various embodiments.

FIG. 2 depicts an example management data storage array 46. Management data storage array 46 includes network interface circuitry 102, storage 112, and one or more storage processors 130 (depicted as storage processors 130(*a*) and 103(*b*)). Each storage processor 103 includes a processor 104 and memory 106. Network interface circuitry 102 may include an Ethernet card, a cellular modem, a Wireless Fidelity (WiFi) wireless networking adapter, any other device for connecting to a network 34, 42, or some combination thereof.

Processor 104 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 106 may be any kind of digital system memory, such as, for example, RAM. Memory 106 stores an OS 108 (e.g., Linux, UNIX, Windows, or similar operating systems) and one or more applications, including RESTful server 36 and storage system management server 40, executing on processor 104 as well as data used by those programs, including optional database 48. Memory 106 may also store a database manager application (not depicted), which may run on processor 104 to provide access to database 48. Memory 106 also stores storage system drivers (not depicted), which execute on processor 104 to provide access to data stored in storage 112.

Storage 112 may be any kind of persistent storage (e.g., solid-state storage and/or disk-based storage) for storing programs and data (not depicted) even while the management data storage array 46 is powered off. The OS 108 and the applications 36, 40 are typically stored both in memory 106 and in persistent storage 112 so that they may be loaded into system memory 106 from persistent storage 112 upon a system restart. Applications 36, 40, when stored in non-transient form either in system memory 106 or in persistent storage 112, form a computer program product. The processor 104 running one or more of these applications 36, 40 thus forms a specialized circuit constructed and arranged to carry out the various processes described herein. A plurality of disk drives arranged in a RAID configuration typically make up the storage 112.

Figure 3:
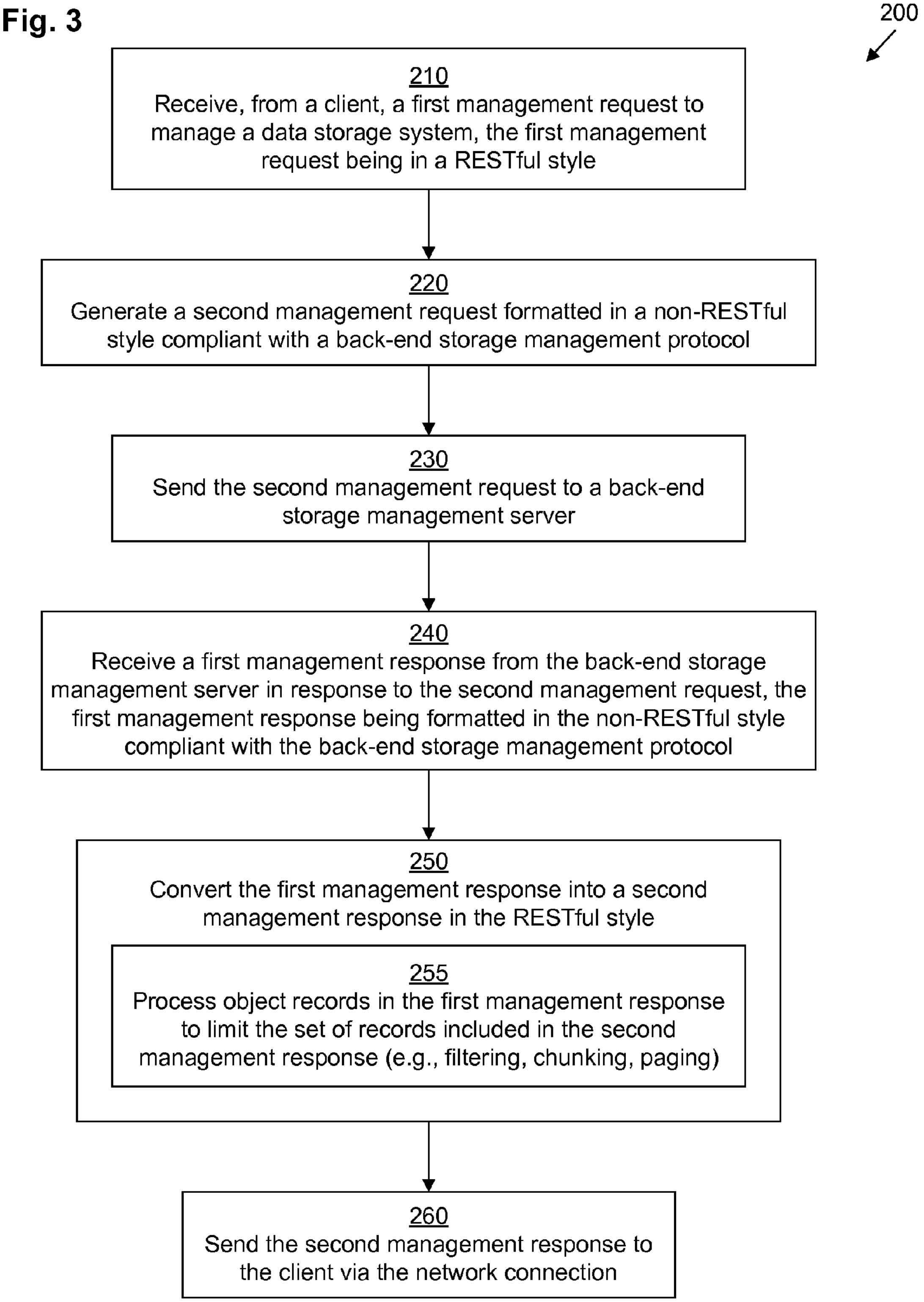
FIG. 3 depicts an example method according to various embodiments.

FIG. 3 depicts an example method 200 performed by RESTful server 36 of the system 35 for mediating, translating, and processing between RESTful communications 70, 82 with management application 33 and CIM-XML based communications 72, 74 with storage system management server 40.

It should be understood that any time a piece of software, such as, for example, application 110 (in the context of, for example, management application 33, Java servlet 50, transformation module 52, processing module 54, database interface module 56, CIM server 60, storage system interface module 62, or database interface module 64) is described as performing a method, process, step, or function, in actuality what is meant is that a computing device 100 on which that application 110 is running performs the method, process, step, or function when executing that piece of software on its processor 104.

In step 210, the RESTful server 36 receives a first management request (e.g., RESTful request 70) to manage the data storage system 44, the first management request being formatted according to a RESTful style, as is well-known in the art. Thus, for example, the RESTful request 70 includes resource representations using HTTP standard methods in a stateless, context-aware, cacheable manner. See FIG. 4A for more detail with respect to RESTful request 70.

In step 220, transformation module 52 generates a second management request (e.g., CIM-XML request 72) formatted in a non-RESTful style compliant with a back-end storage management protocol. Thus, for example, since the storage system management server 40 uses the CIM object format internally to represent objects of the data storage system 44 in a back-end manner, in one embodiment the non-RESTful back-end storage management protocol is CIM formatted using XML (CIM-XML). However, even though CIM-XML may be transported via HTTP, it is not RESTful because it is not a stateless protocol capable of being transported in a context-aware, cacheable manner (i.e., HTTP-aware servers treat the CIM-XML payload as opaque). Also, because CIM-XML does not support processing (such as filtering, chunking, or paging), transformation module 52 may reduce the scope of the instructions within the RESTful request 70. For example, if RESTful request 70 includes a request for all LUNs on data storage array 46(X) with a free capacity less than 1 gigabyte, then the CIM-XML request 72 will be reduced in scope to instead ask for all LUNs on data storage array 46(X) without any filtering. As another example, if RESTful request 70 includes a request for all users of the data storage system 44 in a paged manner with five users per page (and specifically asking for page 3), then the CIM-XML request 72 will be reduced in scope to instead ask for all users of the data storage system 44 without any paging instructions. See FIG. 4B for more detail with respect to CIM-XML request 72.

In some embodiments, transformation module 52 maintains a table (not depicted) that establishes a correspondence between RESTful commands of certain types and particular CIM-XML functions to be called. For example, the table maintained by the transformation module 52 may indicate in a first column a RESTful request including the HTTP GET command operating on a resource "/api/types/user/instances" and in the same row of a second column indicate that the corresponding CIM-XML command is the "EnumerateInstances" function within the "EMC_UIS_User" class.

In step 230, Java servlet 50 sends the generated second management request to the back-end storage management server (e.g., storage system management server 40).

At this point, storage system management server 40 performs activity (not depicted within method 200 because it is done external to the RESTful server 36) to generate an object or set of objects (e.g., a CIM object or a set of CIM objects) in response to the second management request (e.g., CIM-XML request 72) and send back a response (e.g., CIM-XML response 74). Thus, for example, if the CIM-XML request 72 includes an informational request for the set of users with access to the data storage system 44, then storage system interface module 62 collects a set of CIM objects from configuration table 63 that each represent a user of the data storage system 44. As another example, if the CIM-XML request 72 includes an instruction to add a new data storage array 46(Y) to the data storage system 44, then storage system interface module 62 configures the new data storage array 46(Y) to become part of the data storage system 44 and generates a CIM object representing that new data storage array 44(Y). Once the CIM object or set of CIM objects is generated, it is formatted into CIM-XML format and sent back to the RESTful server as CIM-XML response 74.

In step 240, Java servlet 50 receives a first management response (e.g., CIM-XML response 74) from the back-end storage management server (e.g., storage system management server 40) in response to the second management request (e.g., CIM-XML request 72) sent in step 230. The first management response is formatted in the non-RESTful back-end storage management protocol (e.g., CIM-XML). See FIG. 4C for more detail with respect to CIM-XML response 74.

In step 250, transformation module 52 converts the received first management response (e.g., CIM-XML response 74) into a second management response (e.g., RESTful response 82) in the RESTful style. See FIG. 4D for more detail with respect to RESTful response 82.

Depending on the nature of the first management request, step 250 will include sub-step 255, in which processing module 54 performs processing on the set of CIM object records included within the received first management response (e.g., CIM-XML response 74) to limit the set of records included in the second management response (e.g., RESTful response 82). For example, if the RESTful request 70 included a request for all LUNs on data storage array 46(X) with a free capacity less than 1 gigabyte, then since the CIM-XML request 72 was reduced in scope to instead ask for all LUNs on data storage array 46(X) without any filtering, the CIM-XML response 74 will not have been filtered, so it includes CIM object records for all LUNs on data storage array 46(X), including some that have less than 1 gigabyte of free capacity and some that do not have less than 1 gigabyte of free capacity. Thus, in sub-step 255, processing module 52 filters through the CIM object records for all LUNs on data storage array 46(X) returned within the CIM-XML response 74. The filtering step examines data elements within individual CIM object records and removes CIM object records that include a free capacity element indicating that those respective CIM object records have at least 1 gigabyte of free capacity.

Figure 4A:
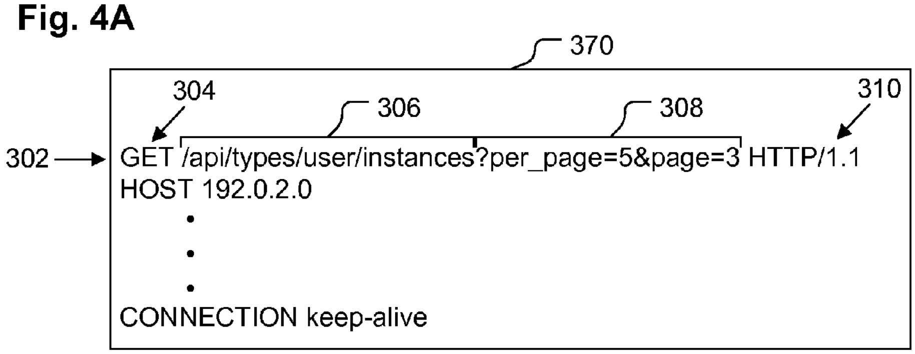
FIGS. 4A-4D depict various example communications between elements of the example system in a first example use case according to various embodiments.
Figure 4B:
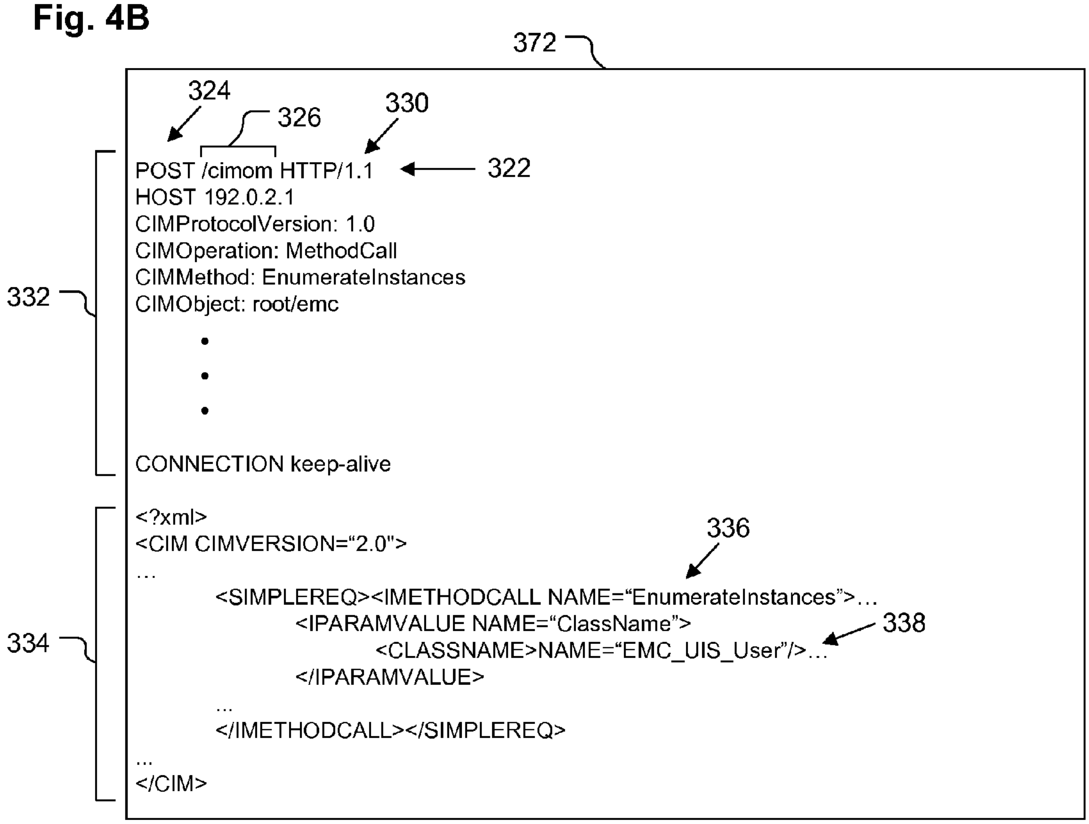
Figure 4C:
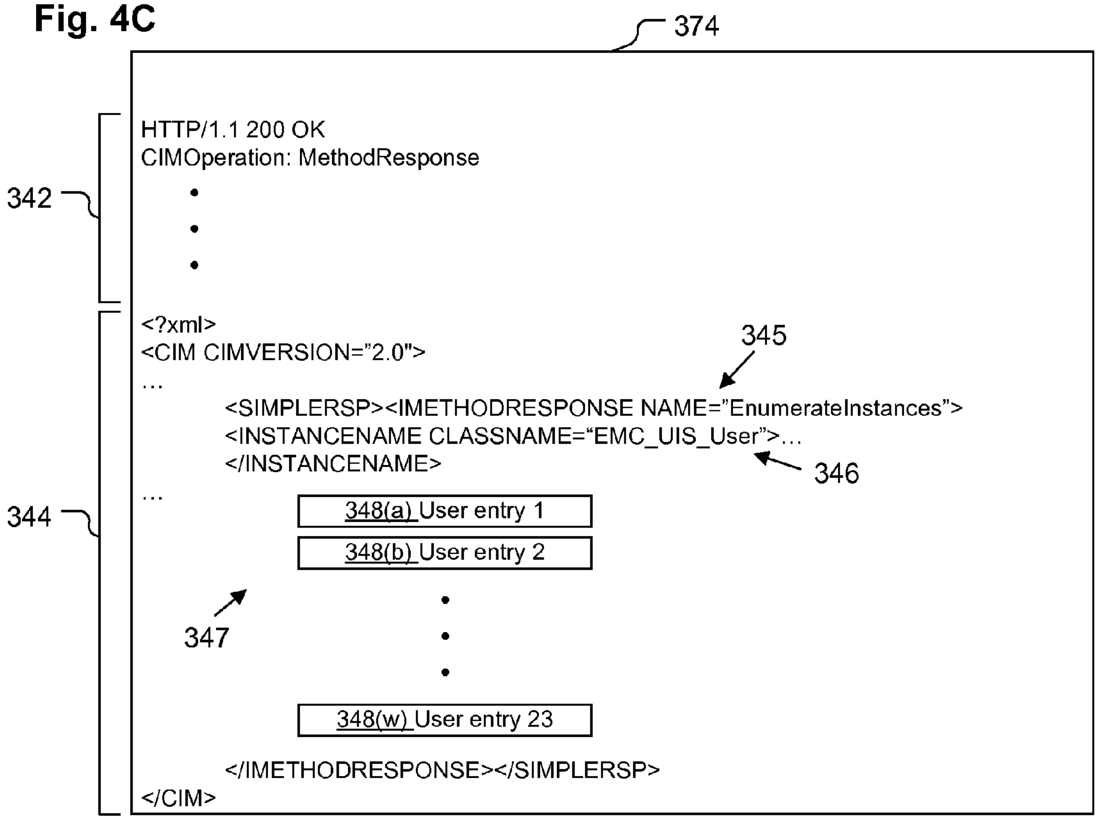

As another example, if the RESTful request 70 included a request for all users of the data storage system 44 in a paged manner with five users per page (specifically asking for page 3), then since the CIM-XML request 72 was reduced in scope to instead ask for all users of the data storage system 44 without any paging instructions, the CIM-XML response 74 will not have been paged, so it may include more than five CIM object records for more than 5 respective users (see FIG. 4C below). If, for example, the CIM-XML response 74 includes twenty-three CIM objects records representing twenty-three users, then, in sub-step 255, processing module 52 pages through the CIM object records for all users returned within the CIM-XML response 74, and selects users eleven through fifteen, corresponding to a third page of users paged five per page. Processing module 52 may also generate links for first, last, previous, and next pages in the paging sequence (see FIG. 4D below).

Finally, in step 260, Java servlet 50 sends the generated second management response (e.g., RESTful response 82) to the client 32 via network 34 in fulfillment of the original RESTful request 70. Because the RESTful response 82 is RESTful, if the original RESTful request 70 was idempotent or nullipotent (e.g., including an HTTP PUT, GET, or DELETE command), then the RESTful response 82 may be cached by HTTP-aware caching servers along the path between RESTful server 36 and client 32 (e.g., within network 34) as a proper response to subsequent identical RESTful requests 70, speeding up future requests and reducing network traffic. As is known in the art, this may be accomplished by establishing an HTTP cache within the HTTP-aware caching servers with the HTTP responses (e.g., RESTful responses 82) keyed to the original HTTP requests (e.g., nullipotent or idempotent RESTful requests 70) or hashes thereof. Furthermore, if the RESTful response 82 has been limited by processing (see sub-step 255), then traffic across network 34 is further reduced by reducing the number of object records sent if not all object records are desired. Even if all object records are ultimately desired by the user, the latency can be improved since the user may not need to see all of the records at the same time. In addition, if the client 32 is a thin client without much processing power (e.g., a cell phone), the limited RESTful response eliminates the need for the slow client 32 to need to filter through the object records by performing the filtering at the RESTful server 36.

In some embodiments, method 200 is performed as described above for all kinds of RESTful requests 70. However, in other embodiments, in order to enhance efficiency, the storage system management server 40 may be bypassed for certain kinds of RESTful requests 70. Thus, say that method 200 is first performed to insert a new user into the set of users of the data storage system by using an HTTP POST command to create a new entry in the collection of users. In these embodiments, prior to step 240, the database interface module 64 of the CIM server 60 sends a database update command 76 including the list of all users of the data storage system 44, each list entry including full data about all the users. Subsequently, if client 32 issues a second RESTful request 70' to view the list of all users of the data storage system 44, there is no need to go back to the CIM server 60 for the list of users because that information is already in the database 48, which is directly accessible to the RESTful server 36. Thus, instead of performing method 200, after the Java servlet 50 receives the second RESTful request 70', the database interface module 56 of the Java servlet 50 issues a database request 78 to the database 48 requesting the list of users, after which the database interface module 56 of the Java servlet 50 receives a database response 80 from the database 48 with the full list of users, allowing the transformation module 52 to generate a second RESTful response 82' to provide that user list to the client 32.

FIGS. 4A-4D depict example requests 70, 72 and responses 74, 82 in an example use case in which the user requests a paged version of the list of users of the data storage system 44. Thus, FIG. 4A depicts example RESTful request 370. RESTful request 370 includes an HTTP command line 302, which includes an HTTP method call 304, a resource identifier, including a path 306 and a query string 308, and an HTTP version number 310 (indicating a version at least 1.1). As depicted, the HTTP method call 304 is GET, the path 306 is "api/types/user/instances" and the query string 308 is "?per_page=5&page=3." The depicted path 306 indicates that the GET method should be applied to a RESTful "instances" collection of users. The depicted query string 308 indicates that the results should be paginated according to a pagination scheme with 5 results per page, and the requested page is page 3 (including results 11-15). RESTful request 370 also includes additional information, some of which is shown, and some of which is omitted for clarity.

FIG. 4B depicts an example CIM-XML request 372 generated by transformation module 52 in step 220 in response to RESTful request 370. CIM-XML request 372 includes an HTTP header portion 332 and a payload portion 334. HTTP header 332 includes an HTTP command line 322, which includes an HTTP method call 324, a path 326, and an HTTP version number 330 (indicating a version at least 1.1). As depicted, the HTTP method call 324 is POST and the path 326 is "/cimom," indicating that the payload 334 should be posted to path 326. HTTP header 334 also includes additional data, some of which is shown, and some of which is omitted for clarity. Payload 334 includes a CIM request formatted in XML using markup taps. As depicted, payload 334 includes a class name specification 338 which indicates that the CIM request is directed at a class named "EMC_UIS_User," which is used for users. In addition, payload 334 also includes a method specification 336 which indicates that the "EnumerateInstances" method of the defined class should be executed in order to enumerate all users of the data storage system 44. Payload 334 also includes additional data, some of which is shown, and some of which is omitted for clarity. It should be recalled that because the CIM-XML format has a more limited processing capability, while the RESTful request 370 defined both a set of objects (i.e., user objects for all users of data storage system 44) and a subset (entries 11-15 on the list of users as paginated), the CIM-XML request 372 only defines the set of objects (i.e., user objects for all users of data storage system 44) without limiting the set by a subset.

FIG. 4C depicts an example CIM-XML response 374 generated by CIM server 60 in response to CIM-XML request 372. CIM-XML response 374 includes an HTTP header portion 342 and a payload portion 344. HTTP header 342 includes certain HTTP data, some of which is depicted and some of which is omitted for the sake of clarity. Payload 344 includes a CIM response formatted in XML using markup taps. As depicted, payload 344 includes a class name specification 346 which indicates that the CIM response is from a class named "EMC_UIS_User," which is used for users, as in FIG. 4B. In addition, payload 344 also includes a method specification 345 which indicates that the "EnumerateInstances" method of the defined class has been executed in order to enumerate all users of the data storage system 44. Payload 344 also includes a set 347 of CIM object records 348 returned (depicted as 348(*a*), 348(*b*), . . . , 348(*w*)), each CIM object record 348(X) for a respective one of the twenty-three users of the data storage system 44. Payload 344 also includes additional data, some of which is shown, and some of which is omitted for clarity.

Figure 4D:
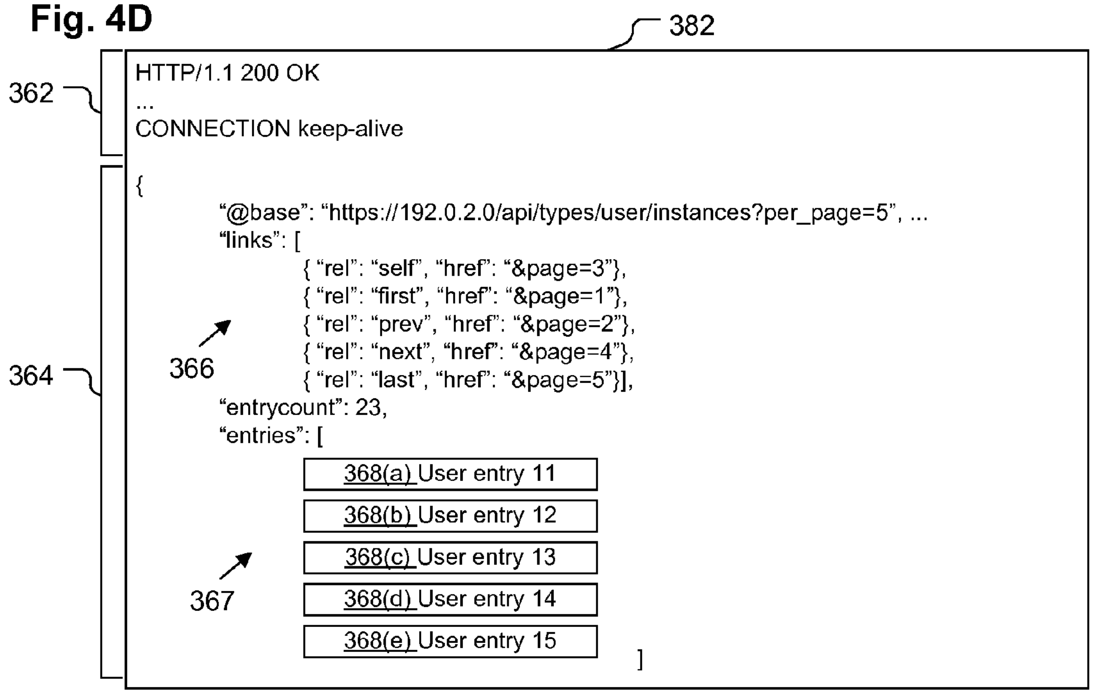

FIG. 4D depicts an example RESTful response 382 generated by transformation module 52 and processing module 54 in response to CIM-XML response 374 in step 250. RESTful response 382 includes an HTTP header portion 362 and a payload portion 364. HTTP header 362 includes certain HTTP data, some of which is depicted and some of which is omitted for the sake of clarity. Payload 364 includes data in response to the original user query in JSON format. Payload 364 includes a set 366 of link entries, which provide pagination navigation information for use by management application 33. Since the requested page was page 3, this information allows the management application 33 to be aware that the response is page 3 of 5. The link information also allows the management application to include links to the first page (page 1), the last page (page 5), the previous page (page 2), and the next page (page 4), to allow the user to easily navigate among the results. Payload 364 also includes a set 367 of user entry records 368 returned (depicted as 368(*a*), 368(*b*), 368(*c*), 368(*d*), 368(*e*)), each user entry record 368(X) for a respective one of the five users of the data storage system 44 which is depicted on the current page, page 3. Each user entry record 368(X) includes data regarding the respective user in a format that the management application 33 can easily display. Payload 364 may also include additional data, some of which is shown, and some of which is omitted for clarity.

Figure 5A:
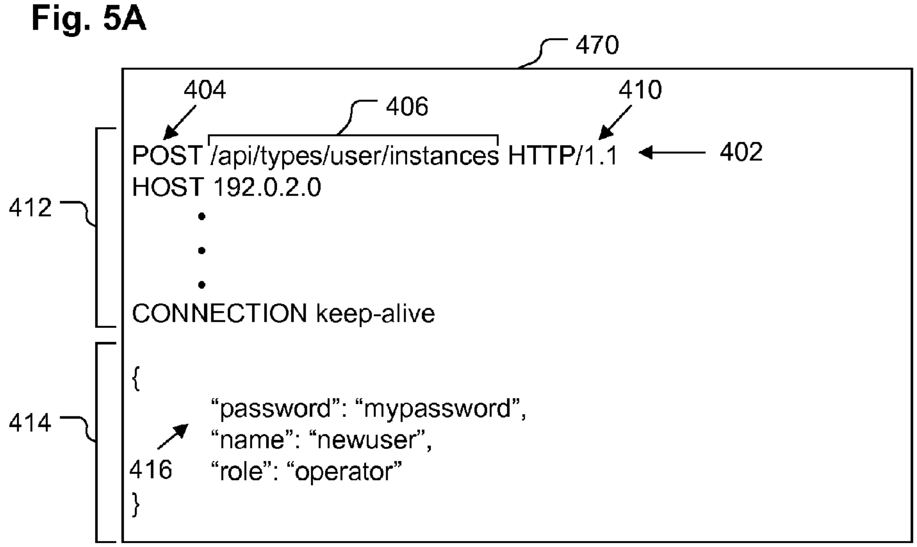

FIGS. 5A-5D depict example requests 70, 72 and responses 74, 82 in an example use case in which the user is trying to add a new user to the data storage system 44. Thus, FIG. 5A depicts example RESTful request 470. RESTful request 470 includes an HTTP header portion 412 and a payload portion 414. HTTP header 412 includes an HTTP command line 402, which includes an HTTP method call 404, a resource identifier including a path 406, and an HTTP version number 410 (indicating a version at least 1.1). As depicted, the HTTP method call 404 is POST and the path 406 is "api/types/user/instances." The depicted path 406 indicates that the POST method should be applied to a RESTful "instances" collection of users. HTTP header 412 also includes certain additional HTTP data, some of which is depicted and some of which is omitted for the sake of clarity. Payload 414 includes a user data definition section 416, which includes, in JSON format, specifications for the new user's username, password, and role.

Figure 5B:
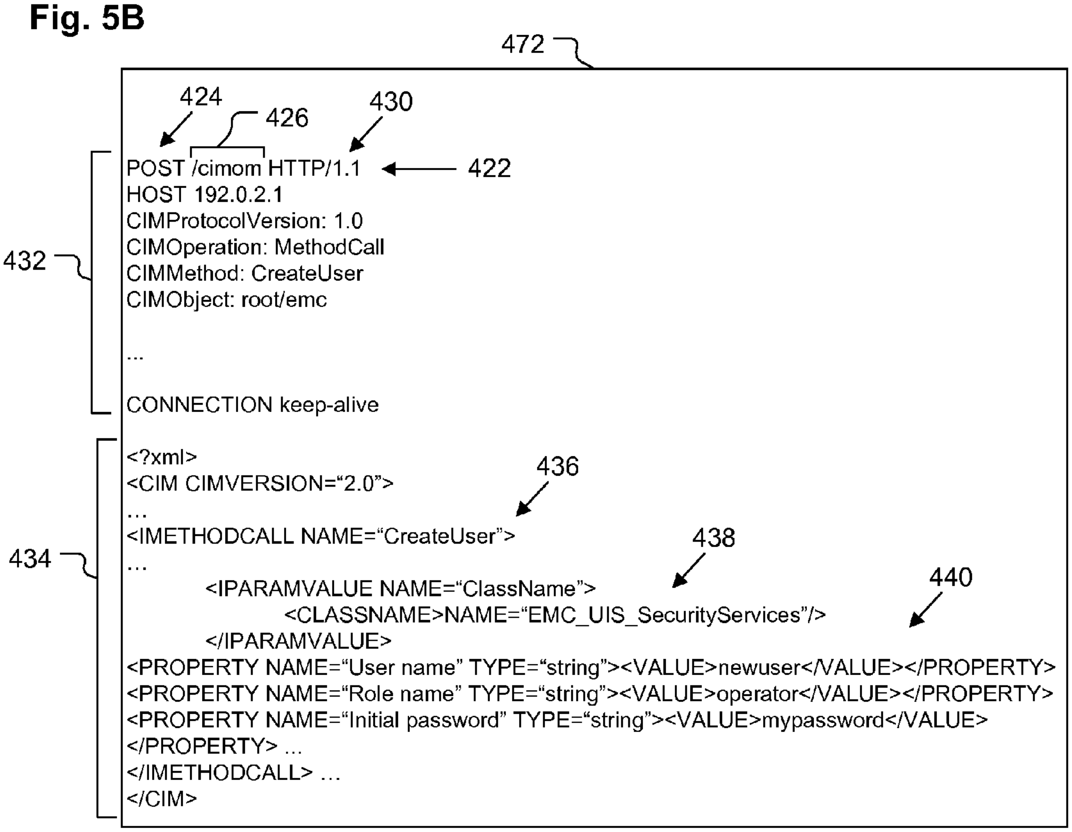

FIG. 5B depicts an example CIM-XML request 472 generated by transformation module 52 in step 220 in response to RESTful request 470. CIM-XML request 472 includes an HTTP header portion 432 and a payload portion 434. HTTP header 432 includes an HTTP command line 422, which includes an HTTP method call 424, a path 426, and an HTTP version number 430 (indicating a version at least 1.1). As depicted, the HTTP method call 424 is POST and the path 426 is "/cimom," indicating that the payload 434 should be posted to path 426. HTTP header 434 also includes additional data, some of which is shown, and some of which is omitted for clarity. Payload 434 includes a CIM request formatted in XML using markup taps. As depicted, payload 434 includes a class name specification 438 which indicates that the CIM request is directed at a class named "EMC_UIS_SecurityServices." In addition, payload 434 also includes a method specification 436 which indicates that the "CreateUser" method of the defined class should be executed in order to add a new user to the data storage system 44. Payload 434 also includes a set 440 of CIM-XML user property definitions corresponding to the new user's information defined in the user data definition section 416 of RESTful request 470. Payload 434 also includes additional data, some of which is shown, and some of which is omitted for clarity.

FIG. 5C depicts an example CIM-XML response 474 generated by CIM server 60 in response to CIM-XML request 472. CIM-XML response 474 includes an HTTP header portion 442 and a payload portion 444. HTTP header 442 includes certain HTTP data, some of which is depicted and some of which is omitted for the sake of clarity. Payload 444 includes a CIM response formatted in XML using markup taps. As depicted, payload 444 includes a class name specification 446 which indicates that the CIM response is from a class named "EMC_UIS_User," which is used for users. In addition, payload 444 also includes a method specification 445 which indicates that the "CreateUser" method of the defined class has been executed in order to create a new user of the data storage system 44. Payload 444 also includes an instance specification 447, which defines the name of the returned EMC_UIS_User instance to be "newuser," as originally requested in RESTful request 470. Payload 444 also includes a job specification 448, which includes various details (not depicted) about the job of the new user. Payload 444 also includes additional data, some of which is shown, and some of which is omitted for clarity.

FIG. 5D depicts an example RESTful response 482 generated by transformation module 52 and processing module 54 in response to CIM-XML response 474 in step 250. RESTful response 482 includes an HTTP header portion 462 and a payload portion 464. HTTP header 462 includes certain HTTP data, some of which is depicted and some of which is omitted for the sake of clarity. Payload 464 includes data in response to the original user query in JSON format. Payload 464 includes a single link entry 466, which indicates that the address of the current page is defined based on the name of the new user "/user_newuser." Payload 464 also includes a content entry 467, which presents the username of the new user. Payload 464 may also include additional data, some of which is shown, and some of which is omitted for clarity.

Thus, techniques have been described for placing a web server (e.g., RESTful server 36) in front of a storage system management server 40 to mediate, translate, and process between RESTful communications 70, 82 with a management application 33 and CIM-XML based communications 72, 74 with the storage system management server 40.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method performed by a computing device executing a web server, the method comprising:

receiving, from a client via a network connection of the computing device, a first management request to manage a data storage system, the first management request being in a RESTful style;

generating, by the computing device executing the web server, a second management request in a non-RESTful style compliant with a back-end storage management protocol;

sending the second management request from the web server to a back-end storage management server;

receiving, by the computing device executing the web server, a first management response from the back-end storage management server in response to the second management request, the first management response being in the non-RESTful style compliant with the back-end storage management protocol;

converting, by the computing device executing the web server, the first management response into a second management response in the RESTful style; and sending, by the computing device executing the web server, the second management response to the client via the network connection;

wherein:

the first management request to manage a data storage system includes a subset request for a strict subset of a set of object records stored by the back-end storage management server;

generating the second management request in the non-RESTful style compliant with the back-end storage management protocol includes placing a set request for the set of object records stored by the back-end storage management server in the second management request;

receiving the first management response from the back-end storage management server in response to the second management request includes receiving the first management response including the set of object records; and converting the first management response into the second management response in the RESTful style includes extracting the strict subset of object records from the set of object records of the first management response to limit object records included in the second management response.

2. The method of claim 1 wherein:

receiving the first management request includes receiving an idempotent HTTP request; and the method further includes caching the second management response using HTTP caching.

3. The method of claim 1 wherein extracting the strict subset of object records from the set of object records of the first management response to limit object records included in the second management response includes filtering object records from the set of object records of the first management response using a search criterion supplied in the subset request for the strict subset of the first management request.

4. The method of claim 1 wherein extracting the strict subset of object records from the set of object records of the first management response to limit object records included in the second management response includes selecting the strict subset of object records from the set of object records of the first management response according to a pagination scheme supplied in the subset request for the strict subset of the first management request.

5. A method performed by a computing device executing a web server, the method comprising:

receiving, from a client via a network connection of the computing device, a first management request to manage a data storage system, the first management request being in a RESTful style, the first management request including an instruction to change a configuration detail of the data storage system;

generating, by the computing device executing the web server, a second management request in a non-RESTful style compliant with a back-end storage management protocol;

sending the second management request from the web server to a back-end storage management server, the back-end storage management server being configured to update a database according to the instruction by inserting the configuration detail into the database;

receiving, by the computing device executing the web server, a first management response from the back-end storage management server in response to the second management request, the first management response being in the non-RESTful style compliant with the back-end storage management protocol;

converting, by the computing device executing the web server, the first management response into a second management response in the RESTful style;

sending, by the computing device executing the web server, the second management response to the client via the network connection; and subsequently:

receiving, from the client via the network connection of the computing device, a third management request to manage the data storage system, the third management request being formatted in the RESTful style, the third management request including a nullipotent instruction to obtain a current configuration detail of the data storage system;

obtaining, by the computing device executing the web server, the current configuration detail of the data storage system from the database;

generating, by the computing device executing the web server, a third management response in the RESTful style, the third management response including the current configuration detail; and sending, by the computing device executing the web server, the third management response to the client via the network connection.

6. A method performed by a computing device executing a web server, the method comprising:

receiving, from a client via a network connection of the computing device, a first management request to manage a data storage system, the first management request being in a RESTful style, the first management request including a nullipotent instruction to obtain a current configuration detail of the data storage system;

generating, by the computing device executing the web server, a second management request in a non-RESTful style compliant with a back-end storage management protocol;

sending the second management request from the web server to a back-end storage management server;

receiving, by the computing device executing the web server, a first management response from the back-end storage management server in response to the second management request, the first management response being in the non-RESTful style compliant with the back-end storage management protocol;

converting, by the computing device executing the web server, the first management response into a second management response in the RESTful style; and sending, by the computing device executing the web server, the second management response to the client via the network connection.

7. An apparatus comprising:

a network adapter configured to connect to a network; and a processor, the processor executing a web server and a back-end storage management server, wherein:

the web server is configured to:

receive, from a client on the network via the network adapter, a first management request to manage a data storage system, the first management request being in a RESTful style, the first management request including an instruction to change a configuration detail of the data storage system;

generate a second management request formatted in a non-RESTful style compliant with a back-end storage management protocol;

send the second management request to the back-end storage management server;

receive a first management response from the back-end storage management server in response to the second management request, the first management response being formatted in the non-RESTful style compliant with the back-end storage management protocol;

convert the first management response into a second management response in the RESTful style; and send the second management response to the client via the network adapter;

the back-end storage management server is configured to:

receive the second management request from the web server;

in response to receiving the second management request, apply the second management request to the data storage system and generate the first management response;

send the first management response to the web server; and update a database according to the instruction by inserting the configuration detail into the database; and the web server is further configured to, subsequently:

receive, from the client via the network adapter, a third management request to manage the data storage system, the third management request being formatted in the RESTful style, the third management request including a nullipotent instruction to obtain a current configuration detail of the data storage system;

obtain the current configuration detail of the data storage system from the database;

generate a third management response in the RESTful style, the third management response including the current configuration detail; and send the third management response to the client via the network adapter.

8. A computer program product comprising a non-transitory computer-readable storage medium storing instructions, which, when executed by a computing device, cause the computing device to execute a web server which performs the following operations:

receiving, from a client via a network connection of the computing device, a first management request to manage a data storage system, the first management request being in a RESTful style;

generating a second management request in a non-RESTful style compliant with a back-end storage management protocol;

sending the second management request from the web server to a back-end storage management server;

receiving a first management response from the back-end storage management server in response to the second management request, the first management response being in the non-RESTful style compliant with the back-end storage management protocol;

converting the first management response into a second management response in the RESTful style; and sending the second management response to the client via the network connection;

wherein:

the first management request to manage a data storage system includes a subset request for a strict subset of a set of object records stored by the back-end storage management server;

generating the second management request in the non-RESTful style compliant with the back-end storage management protocol includes placing a set request for the set of object records stored by the back-end storage management server in the second management request;

receiving the first management response from the back-end storage management server in response to the second management request includes receiving the first management response including the set of object records; and converting the first management response into the second management response in the RESTful style includes extracting the strict subset of object records from the set of object records of the first management response to limit object records included in the second management response.

9. The computer program product of claim 8 wherein:

receiving the first management request includes receiving an idempotent HTTP request; and the instructions, when executed by the computing device, further cause the computing device to cache the second management response using HTTP caching while executing the web server.

10. The computer program product of claim 8 wherein extracting the strict subset of object records from the set of object records of the first management response to limit object records included in the second management response includes filtering object records from the set of object records of the first management response using a search criterion supplied in the subset request for the strict subset of the first management request.

11. The computer program product of claim 8 wherein extracting the strict subset of object records from the set of object records of the first management response to limit object records included in the second management response includes selecting the strict subset of object records from the set of object records of the first management response according to a pagination scheme supplied in the subset request for the strict subset of the first management request.

* * * * *